No. 720,127. PATENTED FEB. 10, 1903.
V. L. GARCIA.
VIBRATORY MEMBRANE FOR PHONOGRAPHS.
APPLICATION FILED FEB. 28, 1902.
NO MODEL. 2 SHEETS—SHEET 1.
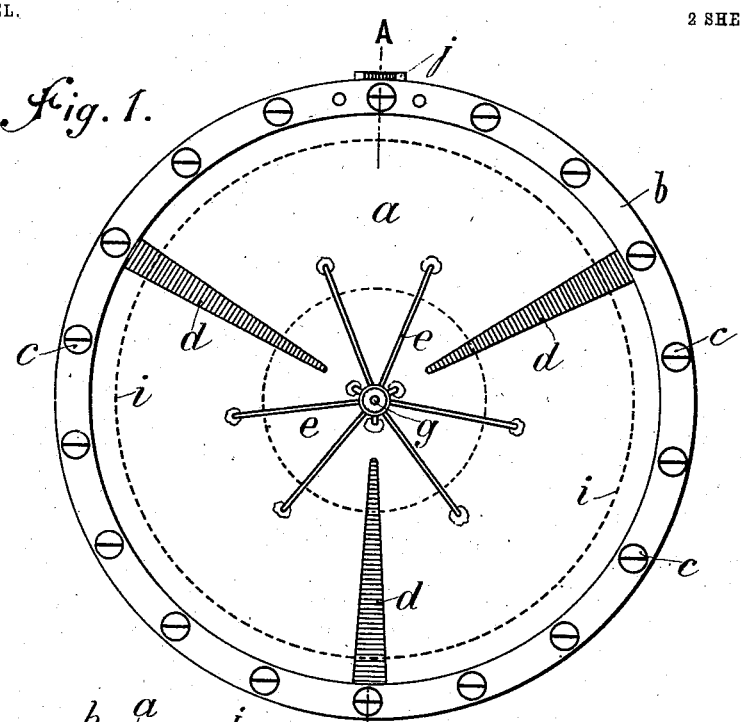
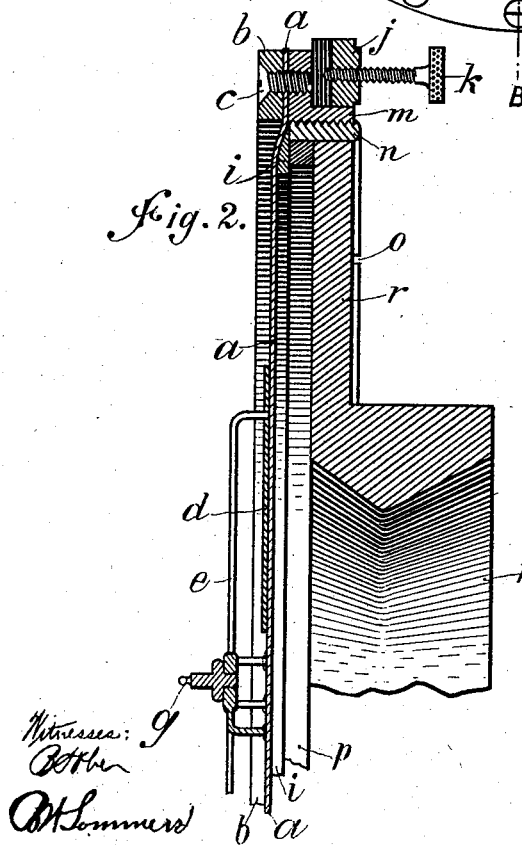
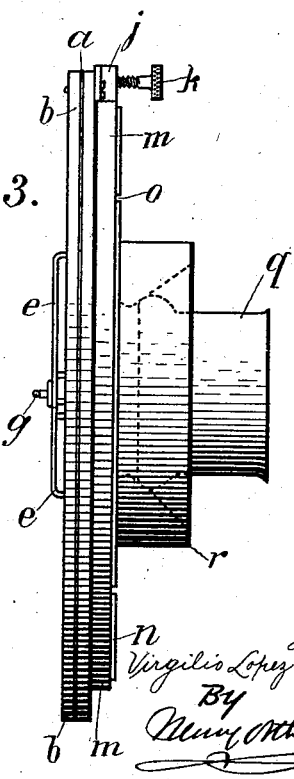
Inventor,
Virgilio Lopez Garcia

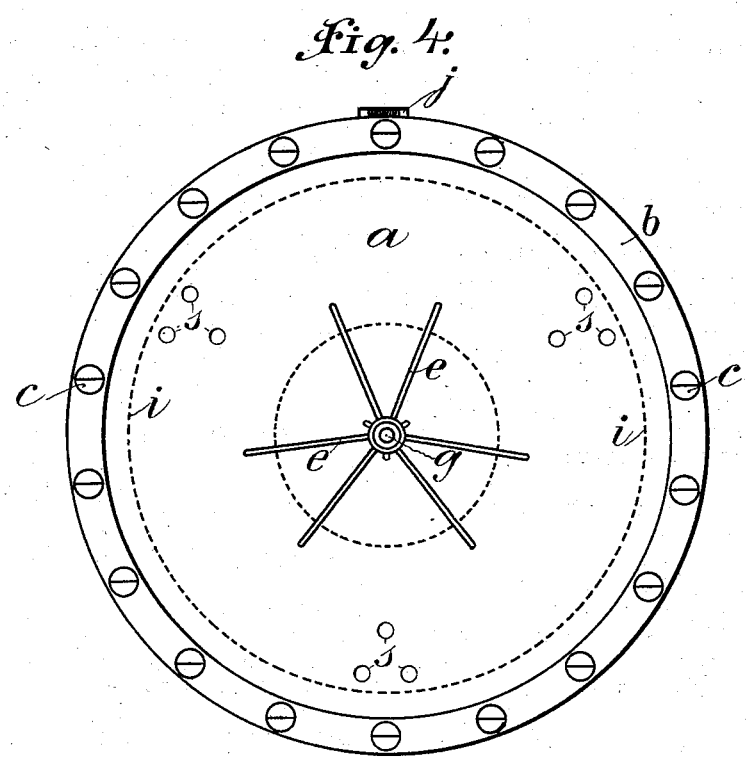

UNITED STATES PATENT OFFICE.

VIRGILIO LOPEZ GARCIA, OF BUENOS AIRES, ARGENTINA.

VIBRATORY MEMBRANE FOR PHONOGRAPHS.

SPECIFICATION forming part of Letters Patent No. 720,127, dated February 10, 1903.

Application filed February 28, 1902. Serial No. 96,126. (No model.)

*To all whom it may concern:*

Be it known that I, VIRGILIO LOPEZ GARCIA, civil engineer, a citizen of Argentina, residing at No. 745 Calle Tucuman, in the city of Buenos Aires, Argentina, have invented new and useful Improvements in Vibratory Membranes for Phonographs, of which the following is a specification.

The membranes that have been used heretofore in phonographic apparatus have a comparatively small diameter, the largest, used by Bettini, measuring only .05 meter in diameter. The reason for not employing large membranes is that the sound-waves that they produce interfere and destroy the fundamental tone, so that the advantage of a larger diameter to produce waves of greater amplitude was negatived.

Now the purpose of this invention is to produce a membrane in which the greater part of the interfering waves are eliminated.

The simplest relation between sounds is when they have the same number of vibrations, thereby producing unison, and when simultaneously sounded will produce a sound of double intensity if in phase and when successively sounded produce a continuous sound. In a membrane that receives four impulses at the same time and of equal intensity and velocity there will be four different centers of vibration to send out interfering sound-waves, and there will be more or less alteration in the sound. It will be readily understood that the membranes of phonographic apparatus may be so connected to the reproducing-style to give two or more centers of vibration simultaneously moved by the style actuated by the impressions in the record-cylinder. Consequently experiment must be made with membranes differing in dimensions in order to find out the most convenient form to be given to the connecting-link to give two or more centers of vibration in the diaphragm that will give the maximum of concordant interference or harmonious relations. This is readily done by causing the membrane to vibrate while covered with a thin layer of fine sand or colored water, when the zones of vibration will be clearly defined, as well as the nodes. It is very important to know the tone of the membrane itself, as such membrane will better reproduce sounds of similar tone. Each membrane of different dimensions or material will have its special connecting-link to the stylus situated in accordance with the interference produced and the tone of the membrane itself. There will be membranes which comprehend a limited series of sounds, according to the kind or class of vibration that they produce—that is to say, that within such limits the reproduction of the sound will be perfect. A good phonographic apparatus must therefore be provided with three or four different membranes, at least, which comprehend within their kind of vibration the greatest possible number of different sounds.

Referring to the accompanying drawings, in which like parts are similarly designated, Figure 1 shows an under side view of the membrane adjusted in its stretching-frame. Fig. 2 is a transverse section on the line A B, Fig. 1. Fig. 3 is a side view of the drum with the diaphragm therein, and Fig. 4 is a modification.

In the diaphragm $a$, preferably, but not necessarily, made of mica, I calculate six zones of vibration, three of which are contrary or out of phase, the action of which latter is substantially destroyed by means of plasters or strips or pieces of a paper $d$ or other substance capable of damping or entirely destroying the vibrations in the diaphragm at these points, while the three concording zones, or those whose vibrations are in phase, are connected to the stylus $g$ by the links $e$, that form a spider and are connected to the smaller central spider $e'$. The maximum of vibration will be at the center of the diaphragm, which is connected to the stylus $g$ by a small spider $e'$.

The drum or stretching-frame, which may be separated from the membrane, consists mainly of two metallic collars or frames of the same diameter $b$ and $m$, the latter being provided with a tapped flange $m'$. Between the frames $b$ and $m$ the membrane $a$ is placed and fixed in position by means of the screws $c$. In order to stretch the membrane, a metallic liner $i$ is introduced inside of the frame $m$, so that the same rests on the membrane. A tapped collar $n$ is then screwed into the said frame $m$, by which the liner $i$ will be fixed in its place to uniformly stretch the membrane. In order to adjust the tapped collar $n$, this has been provided at its upper edge with slots $o$, in which a knife or other instrument may be introduced for guiding the said collar. The air-chamber of the drum is formed by the space existing between the membrane and the wooden cover $r$. In order to form such air-chamber, a rubber cord $t$ is placed around the tapped collar $n$, and on the adjusting-ring $i$ to form a tight seat is mounted the cover $r$, that is provided with the socket $r'$, in which the ball $q$ for the horn rests.

While effecting different experiments, I have discovered that by extinguishing the discording zones by means of perforations or holes in the membrane a clearer and more united sound is produced. This increased clearness of the sound is doubtless owing to the outlet which the said perforations offer to the air inclosed in the chamber. In effect the air inclosed in the chamber when vibrating in accordance with the membrane constantly tends to extinguish by its own vibration those of the membrane. It is therefore necessary to construct the said air-chamber as small as possible; but owing to these perforations, located precisely within the discording zones, these zones will not only be extinguished—that is to say, interference will be eliminated—but also an outlet will be given to the air of the air-chamber, the shocks of which diminish the intensity of the sound of the membrane.

Fig. 4 shows a plan view of a membrane similar to that represented in Fig. 1, but in which the discordant zones have been extinguished by means of perforations. In this case the cover should be of spherical shape in order to enlarge the air-chamber and the rubber cord should not be employed.

Having thus described my said invention, what I claim as new therein, and desire to secure by Letters Patent, is—

1. In a phonographic reproducing device, the combination with a suitable diaphragm and its supporting-frame, of a stylus connected to the diaphragm where there is maximum vibration, auxiliary connections between the diaphragm and stylus at a distance from the center at points of concordant interfering vibration, means at points of discordant vibration to annul the latter, substantially as set forth.

2. In a phonographic reproducing device, the combination with a suitable diaphragm and its supporting-frame, of a stylus, a spider connecting the stylus with the center of the diaphragm and an auxiliary spider also connected to the stylus and to the diaphragm at points of concordant interfering vibration at a distance from the center of the diaphragm, and devices on the diaphragm intermediate the points of discordant vibration to dampen the latter, substantially as set forth.

3. In a phonographic reproducing device, the combination with a suitable diaphragm, its supporting-frame and casing, of a beveled ring $i$ between the diaphragm and casing to stretch said diaphragm, a stylus connected to the diaphragm at the point of maximum vibration, auxiliary connections between the stylus and diaphragm at points of vibration in phase, and tapered strips of a suitable material secured to the diaphragm extending from the outer part toward the center at points of vibration out of phase with the others, substantially as set forth.

4. In a phonograph, the combination with a diaphragm, of a stylus connected to the diaphragm at points of harmonic vibration and means to destroy or dampen those portions of the diaphragm vibrating out of harmony with the fundamental, substantially as set forth.

5. In a phonograph, the combination with a diaphragm, of a stylus connected to the diaphragm to reproduce the fundamental and at other harmonic points, and means to dampen or destroy those vibrations out of harmony, substantially as set forth.

6. In a phonograph, the combination with a diaphragm, of a stylus connected to the diaphragm at its point of maximum vibration and at other points producing concordant interfering sounds, and dampers secured to the diaphragm at points of discordant interfering vibrations, substantially as set forth.

7. In a phonograph, the combination with a diaphragm, of a stylus connected to the diaphragm at its point of maximum vibration and at other points producing concordant interfering sounds, and strips of paper secured to the diaphragm at points of discordant interfering vibration, substantially as set forth.

In testimony whereof I have signed my name to this specification in the presence of two subscribing witnesses.

VIRGILIO LOPEZ GARCIA.

Witnesses:
PEDRO ALBERTO BREUER,
ANTO. L. BELLO.